(12) United States Patent
Crothers et al.

(10) Patent No.: US 9,709,278 B2
(45) Date of Patent: Jul. 18, 2017

(54) SYSTEM AND METHOD FOR CONTROL OF COMBUSTION DYNAMICS IN COMBUSTION SYSTEM

(71) Applicant: General Electric Company, Schenectady, NY (US)

(72) Inventors: Sarah Lori Crothers, Greenville, SC (US); Charlotte Cole Wilson, Roebuck, SC (US)

(73) Assignee: General Electric Company, Schenectady, NY (US)

( * ) Notice: Subject to any disclaimer, the term of this patent is extended or adjusted under 35 U.S.C. 154(b) by 396 days.

(21) Appl. No.: 14/207,041

(22) Filed: Mar. 12, 2014

(65) Prior Publication Data

US 2015/0260407 A1    Sep. 17, 2015

(51) Int. Cl.
*F23R 3/34* (2006.01)
*F02C 7/22* (2006.01)

(52) U.S. Cl.
CPC .............. *F23R 3/346* (2013.01); *F02C 7/22* (2013.01)

(58) Field of Classification Search
None
See application file for complete search history.

(56) References Cited

U.S. PATENT DOCUMENTS

| 2,072,826 A | 3/1937 | Riley |
| 4,044,553 A | 8/1977 | Vaught |
| 4,620,414 A | 11/1986 | Christ |
| 4,677,822 A | 7/1987 | Iizuka et al. |
| 4,724,670 A | 2/1988 | Greer |
| 4,901,694 A | 2/1990 | Sakita |

(Continued)

FOREIGN PATENT DOCUMENTS

| EP | 1605205 | 12/2005 |
| EP | 1632718 | 3/2006 |

(Continued)

OTHER PUBLICATIONS

Richards, Geo et al., "Effect of Fuel System Impedance Mismatch on Combustion Dynamics," ASME Turbo Expo 2005: Power for Land, Sea, and Air, vol. 2, Paper No. GT2005-68386, Reno, Nevada, Jun. 6-9, 2005, 11 pgs.

(Continued)

*Primary Examiner* — Jacob Cigna
(74) *Attorney, Agent, or Firm* — Charlotte C. Wilson; Ernest G. Cusick; Frank A. Landgraff

(57) ABSTRACT

A system includes a gas turbine engine that includes a first combustor and a second combustor. The first combustor includes a first fuel nozzle disposed in a first head end chamber of the first combustor and a first fuel injector. The first fuel nozzle is configured to inject a first fuel and an oxidant into a first combustion chamber of the first combustor. The second combustor includes a second fuel nozzle disposed in a second head end chamber of the second combustor, a second fuel injector, and a second orifice plate disposed in a second fuel path upstream of the second fuel injector. The second fuel nozzle is configured to inject the first fuel and the oxidant into a second combustion chamber of the second combustor and the second orifice plate is configured to help reduce modal coupling between the first combustor and the second combustor.

18 Claims, 3 Drawing Sheets

(56) References Cited

U.S. PATENT DOCUMENTS

| | | | |
|---|---|---|---|
| 5,159,807 A | 11/1992 | Forestier | |
| 5,211,004 A | 5/1993 | Black | |
| 5,319,931 A * | 6/1994 | Beebe | F02C 7/228 60/39.281 |
| 5,345,758 A | 9/1994 | Bussing | |
| 5,575,144 A | 11/1996 | Brough et al. | |
| 5,657,631 A | 8/1997 | Androsov | |
| 5,809,769 A | 9/1998 | Richards et al. | |
| 5,943,866 A | 8/1999 | Lovett et al. | |
| 6,164,055 A | 12/2000 | Lovett et al. | |
| 6,625,569 B2 | 9/2003 | James et al. | |
| 6,820,431 B2 | 11/2004 | McManus et al. | |
| 7,278,266 B2 | 10/2007 | Taware et al. | |
| 7,320,222 B2 | 1/2008 | Flohr et al. | |
| 7,331,182 B2 | 2/2008 | Graf et al. | |
| 7,337,057 B2 | 2/2008 | Norman et al. | |
| 7,451,601 B2 | 11/2008 | Taware et al. | |
| 7,503,177 B2 | 3/2009 | Bland et al. | |
| 7,523,614 B2 | 4/2009 | Tanimura et al. | |
| 7,578,130 B1 | 8/2009 | Kraemer et al. | |
| 7,620,461 B2 | 11/2009 | Frederick, II et al. | |
| 7,693,147 B2 | 4/2010 | Williams et al. | |
| 7,739,999 B2 | 6/2010 | Kang et al. | |
| 7,743,599 B2 | 6/2010 | Taware et al. | |
| 7,805,922 B2 | 10/2010 | Bland | |
| 7,886,545 B2 * | 2/2011 | Lacy | F23R 3/286 60/39.37 |
| 7,908,072 B2 | 3/2011 | Tonno et al. | |
| 7,997,083 B2 | 8/2011 | Meadows et al. | |
| 8,112,216 B2 * | 2/2012 | Davis, Jr. | F02C 7/22 60/740 |
| 8,113,000 B2 | 2/2012 | Laster et al. | |
| 8,322,140 B2 | 12/2012 | Kim et al. | |
| 8,966,909 B2 | 3/2015 | Crothers et al. | |
| 9,027,349 B2 | 5/2015 | Miura et al. | |
| 2003/0144787 A1 | 7/2003 | Davis, Jr. et al. | |
| 2004/0083738 A1 | 5/2004 | McManus et al. | |
| 2005/0278108 A1 | 12/2005 | Norman et al. | |
| 2006/0041368 A1 | 2/2006 | Williams et al. | |
| 2006/0042261 A1 | 3/2006 | Taware et al. | |
| 2006/0107666 A1 * | 5/2006 | Kothnur | F02C 7/222 60/773 |
| 2006/0254279 A1 | 11/2006 | Taware et al. | |
| 2007/0180831 A1 | 8/2007 | Bland | |
| 2007/0199328 A1 | 8/2007 | Shah et al. | |
| 2008/0010966 A1 | 1/2008 | Taware et al. | |
| 2009/0005951 A1 | 1/2009 | Frederick et al. | |
| 2009/0005952 A1 | 1/2009 | Tonno et al. | |
| 2009/0063003 A1 | 3/2009 | Meadows et al. | |
| 2009/0320483 A1 * | 12/2009 | Storey | F23D 11/38 60/747 |
| 2010/0170254 A1 | 7/2010 | Venkataraman et al. | |
| 2010/0192578 A1 | 8/2010 | Singh et al. | |
| 2010/0232930 A1 | 9/2010 | Gregory | |
| 2010/0236214 A1 | 9/2010 | Wiedenhoefer et al. | |
| 2010/0313568 A1 | 12/2010 | Davis, Jr. et al. | |
| 2011/0048021 A1 | 3/2011 | Slobodyanskiy et al. | |
| 2011/0072826 A1 | 3/2011 | Narra et al. | |
| 2011/0162370 A1 | 7/2011 | Kim et al. | |
| 2011/0179795 A1 | 7/2011 | Johnson et al. | |
| 2011/0308654 A1 | 12/2011 | Bothien et al. | |
| 2012/0006029 A1 | 1/2012 | Bilbao et al. | |
| 2012/0131923 A1 * | 5/2012 | ELKady | F23R 3/14 60/772 |
| 2012/0144832 A1 | 6/2012 | Herbon et al. | |
| 2013/0000312 A1 | 1/2013 | Kodukulla et al. | |
| 2013/0014514 A1 | 1/2013 | Romig et al. | |
| 2014/0053528 A1 | 2/2014 | Crothers et al. | |
| 2014/0060063 A1 | 3/2014 | Boardman et al. | |
| 2014/0109587 A1 | 4/2014 | Crothers et al. | |
| 2014/0137561 A1 | 5/2014 | Crothers et al. | |
| 2014/0238026 A1 | 8/2014 | Boardman et al. | |
| 2014/0238033 A1 | 8/2014 | Crothers et al. | |
| 2014/0238041 A1 | 8/2014 | Crothers et al. | |
| 2014/0260299 A1 | 9/2014 | Boardman et al. | |
| 2014/0338341 A1 | 11/2014 | Abreu | |
| 2015/0219337 A1 | 8/2015 | Crothers et al. | |
| 2015/0260407 A1 | 9/2015 | Crothers et al. | |
| 2015/0285508 A1 | 10/2015 | Olson | |

FOREIGN PATENT DOCUMENTS

| | | |
|---|---|---|
| EP | 2031192 | 3/2009 |
| JP | 2009281720 A * | 12/2009 |
| JP | 2012102733 A * | 5/2012 |

OTHER PUBLICATIONS

Spoor et al., "Mode-locking of acoustic resonators and its application to vibration cancellation in acoustic heat engines," Condensed Matter and Thermal Physics Group, Los Alamos National Laboratory, Los Alamos, New Mexico, Feb. 10, 1999, 10 pgs.
U.S. Appl. No. 14/276,700, filed May 13, 2014, Crothers et al.
U.S. Appl. No. 14/249,158, filed Apr. 9, 2014, Ziminsky et al.
U.S. Appl. No. 14/248,194, filed Apr. 8, 2014, Stevenson et al.
U.S. Appl. No. 14/288,875, filed May 28, 2014, Crothers et al.
U.S. Appl. No. 14/288,974, filed May 28, 2014, Crothers et al.
U.S. Appl. No. 14/316,616, filed Jun. 26, 2014, Crothers et al.
U.S. Appl. No. 14/659,399, filed Mar. 16, 2015, DiCintio et al.
U.S. Appl. No. 14/171,001, filed Feb. 3, 2014, Crothers et al.
U.S. Appl. No. 14/192,687, filed Feb. 27, 2014, Crothers et al.
U.S. Appl. No. 14/170,702, filed Feb. 3, 2014, Day et al.
U.S. Appl. No. 14/170,710, filed Feb. 3, 2014, Carnell Jr. et al.
U.S. Appl. No. 14/170,716, filed Feb. 3, 2014, Crothers et al.
U.S. Appl. No. 14/170,729, filed Feb. 3, 2014, Crothers et al.
U.S. Appl. No. 14/170,738, filed Feb. 3, 2014, Crothers et al.
U.S. Appl. No. 14/154,925, filed Jan. 14, 2014, Aphale et al.
U.S. Appl. No. 14/048,252, filed Oct. 8, 2013, Crothers et al.

* cited by examiner

SYSTEM AND METHOD FOR CONTROL OF COMBUSTION DYNAMICS IN COMBUSTION SYSTEM

BACKGROUND

The disclosed subject matter relates generally to gas turbine systems, and more particularly, to a system and method for controlling combustion dynamics, and more specifically, for reducing modal coupling of combustion dynamics.

Gas turbine systems generally include a gas turbine engine having a compressor section, a combustor section, and a turbine section. The combustor section may include one or more combustors (e.g., combustion cans) with fuel nozzles configured to inject a fuel and an oxidant (e.g., air) into a combustion chamber within each combustor. In each combustor, a mixture of the fuel and oxidant combusts to generate hot combustion gases, which then flow into and drive one or more turbine stages in the turbine section. Each combustor may generate combustion dynamics, which occur when the combustor acoustic oscillations interact with the flame dynamics (also known as the oscillating component of the heat release), to result in a self-sustaining pressure oscillation in the combustor. Combustion dynamics can occur at multiple discrete frequencies or across a range of frequencies, and can travel both upstream and downstream relative to the respective combustor. For example, the pressure and/or acoustic waves may travel downstream into the turbine section, e.g., through one or more turbine stages, or upstream into the fuel system. Certain components of the turbine system can potentially respond to the combustion dynamics, particularly if the combustion dynamics generated by the individual combustors exhibit an in-phase and coherent relationship with each other, and have frequencies at or near the natural or resonant frequencies of the components. As discussed herein, "coherence" may refer to the strength of the linear relationship between two dynamic signals, and may be strongly influenced by the degree of frequency overlap between them. In the context of combustion dynamics, "coherence" is a measure of the modal coupling, or combustor-to-combustor acoustic interaction, exhibited by the combustion system. Accordingly, a need exists to control the combustion dynamics, and/or modal coupling of the combustion dynamics, to reduce the possibility of any unwanted sympathetic vibratory response (e.g., resonant behavior) of components in the turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine that includes a first combustor and a second combustor. The first combustor includes a first fuel nozzle disposed in a first head end chamber of the first combustor. The first fuel nozzle is configured to inject a first fuel and an oxidant into a first combustion chamber of the first combustor. The first combustor also includes a first fuel injector configured to inject a second fuel into at least one of the oxidant upstream of the first fuel nozzle, or the first combustion chamber downstream of the first fuel nozzle, or any combination thereof. The second combustor includes a second fuel nozzle disposed in a second head end chamber of the second combustor. The second fuel nozzle is configured to inject the first fuel and the oxidant into a second combustion chamber of the second combustor. The second combustor also includes a second fuel injector configured to inject the second fuel into at least one of the oxidant upstream of the second fuel nozzle, or the second combustion chamber downstream of the second fuel nozzle, or any combination thereof. The second combustor also includes a second orifice plate disposed in a second fuel path upstream of the second fuel injector, wherein the second orifice plate is configured to help reduce modal coupling between the first combustor and the second combustor.

In a second embodiment, a system includes a first turbine combustor that includes a first fuel nozzle disposed in a first head end chamber of the first combustor. The first fuel nozzle is configured to inject a first fuel and an oxidant into a first combustion chamber of the first combustor. The first turbine combustor also includes a first fuel injector configured to inject a second fuel into at least one of the oxidant upstream of the first fuel nozzle, or the first combustion chamber downstream of the first fuel nozzle, or any combination thereof. The first turbine combustor also includes a first orifice plate disposed in a second fuel path upstream of the first fuel injector. The first orifice plate is configured to at least partially control first combustion dynamics in the first turbine combustor.

In a third embodiment, a method includes injecting a first fuel and an oxidant into a first combustion chamber of a first combustor using a first fuel nozzle disposed in a first head end chamber of the first combustor, injecting a second fuel into at least one of the oxidant upstream of the first fuel nozzle, or the first combustion chamber downstream of the first fuel nozzle, or any combination thereof, using a first fuel injector, injecting the first fuel and the oxidant into a second combustion chamber of a second combustor using a second fuel nozzle disposed in a second head end chamber of the second combustor, injecting the second fuel into at least one of the oxidant upstream of the second fuel nozzle, or the second combustion chamber downstream of the second fuel nozzle, or any combination thereof, using a second fuel injector, and controlling second combustion dynamics in the second combustor with a second orifice plate disposed in a second fuel path upstream of the second fuel injector, wherein the second orifice plate is configured to help reduce modal coupling between the first combustor and the second combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
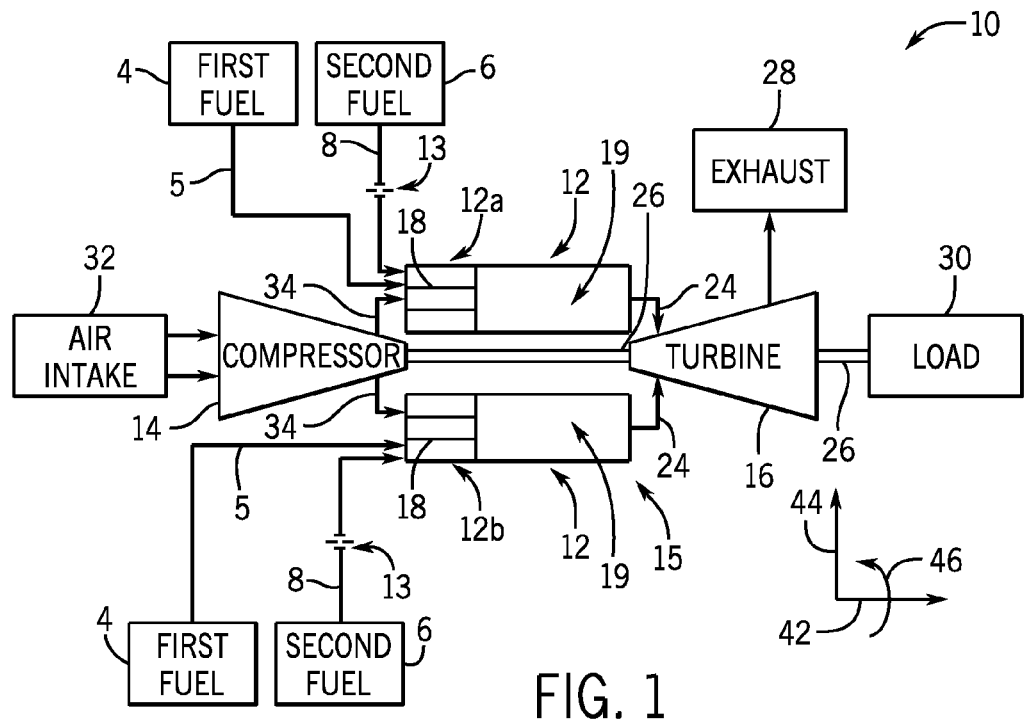
FIG. 1 is a schematic of an embodiment of a gas turbine system having a plurality of combustors with an orifice plate configured to control combustion dynamics and/or modal coupling of combustion dynamics to reduce the possibility of unwanted vibratory responses in downstream components.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed toward reducing combustion dynamics and/or modal coupling of combustion dynamics to reduce unwanted vibratory responses in downstream components in a gas turbine system by varying geometries of one or more turbine combustors, e.g., disposing orifice plates in a fuel path upstream of one or more fuel nozzles, one or more quaternary (e.g., quat) pegs, and/or one or more late lean injectors disposed circumferentially around a liner of the turbine combustor and axially downstream from the fuel nozzles disposed in a head end of the turbine combustor. As used herein, an "orifice plate" may be defined as a plate having one or more holes, or orifices, therethrough, which limit fluid flow through the orifice plate. A gas turbine combustor (or combustor assembly) may generate combustion dynamics due to the combustion process, characteristics of intake fluid flows (e.g., fuel, oxidant, diluent, etc.) into the combustor, and various other factors. The combustion dynamics may be characterized as pressure fluctuations, pulsations, oscillations, and/or waves at certain frequencies. The intake fluid flow characteristics may include velocity, pressure, fluctuations in velocity and/or pressure, variations in flow paths (e.g., turns, shapes, interruptions, etc.), or any combination thereof. Collectively, the combustion dynamics can potentially cause vibratory responses and/or resonant behavior in various components downstream from the combustor. For example, the combustion dynamics (e.g., at certain frequencies, ranges of frequencies, amplitudes, etc.) can travel downstream in the gas turbine system. If the downstream components have natural or resonant frequencies that are driven by these pressure fluctuations (e.g., combustion dynamics), then the pressure fluctuations can potentially cause vibration, stress, fatigue, etc. The components may include turbine nozzles, turbine blades, turbine shrouds, turbine wheels, bearings, or any combination thereof. The downstream components are of specific interest, as they are more sensitive to combustion tones that are in-phase and coherent. Thus, reducing coherence specifically reduces the possibility of unwanted vibrations in downstream components.

As discussed in detail below, the disclosed embodiments may equip one or more gas turbine combustors with an orifice plate disposed in a fuel path upstream of a fuel injector to modify the distribution of fuel to the various fuel circuits in the combustor. A fuel circuit may include one or more fuel nozzles in the head end of the combustor, one or more quat pegs located in an aft casing of the combustor, and/or late lean fuel injectors circumferentially disposed around the liner, located axially downstream from the head end. In particular, the orifice plate may alter a fuel split at an individual combustor compared to another combustor, thereby altering the fuel flow to a given fuel nozzle in the head end, quat peg or late lean fuel injector positioned downstream from the head end. A change in the fuel nozzle pressure ratio and/or equivalence ratio resulting from differences in the fuel flow rate to a given fuel nozzle, group of fuel nozzles, quat pegs, or late lean fuel injectors, may directly affect the combustion instability frequency and/or amplitude in one or more combustors. As the frequency of the combustion dynamics in one or more combustors is driven away from that of the other combustors, coherence and, therefore, modal coupling of the combustion dynamics are reduced. As a result, various embodiments of the present invention may reduce the ability of the combustor tone to cause a vibratory response in downstream components.

The disclosed embodiments may vary the orifice plate configurations among a plurality of gas turbine combustors, thereby varying the combustion dynamics from combustor-to-combustor in a manner to reduce the combustion dynamics amplitudes and/or modal coupling of the combustion dynamics among the plurality of gas turbine combustors. For example, the changes in fuel split caused by the orifice plate configurations may result in combustor-to-combustor variations in the fuel split, and therefore, combustion dynamics frequencies, thereby reducing the possibility of modal coupling of the combustors, particularly at frequencies that are aligned with resonant frequencies of the components of the gas turbine system. Thus, by changing the effective orifice areas of the orifice plates of the plurality of gas turbine combustors, the frequencies may be shifted from combustor-to-combustor, disrupting modal coupling. In other words, by reducing the similarity of frequencies in the plurality of gas turbine combustors, the coherence may be reduced.

Accordingly, a gas turbine engine may employ a variety of orifice plate configurations to alter the fuel split of the combustor, thereby altering the combustion dynamics of the combustor and therefore mitigate unwanted vibratory responses in the gas turbine system components caused by combustion dynamics in the combustors. For example, the geometry of the orifice plate of one or more gas turbine combustors may include one or more angled surfaces, curved surfaces (e.g., concave surfaces, convex surfaces, constant curvatures, or varying curvatures), flat surfaces, recesses, protrusions, polygonal surfaces (e.g., triangular surfaces, pentagonal surfaces, hexagonal surfaces, or quadrilateral surfaces), stepped or zigzagging surfaces, winding surfaces, irregular surfaces (e.g., non-uniform, uneven, or asymmetrical; wavy surface, jagged surfaces, pointed surfaces, or serrated surfaces), or any combination thereof. In some embodiments, at least some (e.g., 2, 3, 4, 5, 6, 7, 8, 9, or 10) or all of the turbine combustors have different orifice plates, such as different angled orifice plates, different curved orifice plates, different flat orifice plates, different orifice configurations, or any combination thereof. In some embodiments, geometrical characteristics (e.g., height, width, depth, length, degree of angle, angle characteristics, radius of curvature, orientation of geometrical features, etc.) between orifices of the orifice plates in the fuel lines supplying different combustors may be different. Particularly, in some embodiments, combustor orifice plates associated with different combustors may have any one of different geometric shapes, different geometric characteristics, different geometric arrangements, or any combination thereof.

Accordingly, the disclosed embodiments employing one or more combustors having one or more varying orifice plates helps to vary the fuel split of one or more combustors, thereby varying the combustion dynamics within the combustors and among adjacent, or non-adjacent, combustors. The use of the disclosed embodiments helps mitigate the modal coupling of the combustors, which reduces the possibility of unwanted vibratory response in components downstream from the combustors, as well as the combustors themselves. For example, providing one or more combustors with an orifice plate in the fuel supply line with a different geometry (e.g., a different geometric shape, characteristic, or arrangement) compared to one or more of the other combustors, may provide a different fuel split from combustor-to-combustor, thereby altering the combustion dynamics from combustor-to-combustor, reducing the possibility of coherent behavior of the combustors of the gas turbine system.

With the foregoing in mind, FIG. 1 is a schematic of an embodiment of a gas turbine system 10 having a plurality of combustors 12, wherein one or more combustors 12 is equipped with a combustor orifice plate 13 having a configuration and/or a geometry different from the combustor orifice plate 13 of at least one other combustor 12. It should be noted that in certain embodiments, not all combustors 12 have the combustor orifice plate 13. As discussed below, the orifice plate 13 may be disposed in a second fuel path 8 conveying a second fuel 6 to the combustor 12. In certain embodiments, additional orifice plates 13 may be disposed in one or more fuel circuits supplying fuel to fuel nozzles in a head end of the combustors 12. As discussed above, each orifice plate 13 includes one or more holes, or orifices, which limit the flow of the second fuel 6 through the orifice plate 13. The holes in each orifice plate 13 collectively define an effective orifice area through the orifice plate 13 that determines the mass flow of fluid (e.g., the second fuel 6) through the orifice plate 13 for a given differential pressure across the orifice plate 13. The effective orifice area of the orifice plate 13 is the combined area through which the second fuel 6 passes and may be calculated as the total cross-sectional area of the holes in the orifice plate 13 multiplied by a coefficient of flow or discharge efficient. The coefficient of flow may represent a ratio of the actual and theoretical maximum flows through the orifice plate 13.

In one or more of the combustors 12 shown in FIG. 1, the orifice plate 13 may have a configuration configured to change the combustion dynamics in the particular combustor 12, thereby helping to reduce any unwanted vibratory responses in components downstream of the combustor 12. For example, the orifice plate configuration may include geometrical features to change either the geometric or effective orifice area of the orifice plate, thereby changing the flow through the fuel circuit, and ultimately the fuel split in the combustor, and ultimately altering the amplitudes and frequencies of the combustion dynamics generated by a given combustor. In addition, the disclosed embodiments may vary the geometry of orifice plates 13 between the plurality of combustors 12 to help reduce or avoid any modal coupling of the combustion dynamics among the plurality of combustors 12, thereby helping to reduce any unwanted vibratory response of gas turbine components downstream of the plurality of combustors 12. For example, the disclosed embodiments may vary the geometric shape (e.g., angled, curved, stepped, concave, convex, or flat), the geometric characteristics (e.g., height, width, depth, length, degree of angle, angle characteristics, radius of curvature, distance between orifices), the geometric arrangements (e.g., regular, irregular, etc.), or any combination thereof, of the orifice plates 13 among the plurality of combustors 12. As a result, the non-uniform geometrical configuration of orifice plates 13 among the combustors 12 may help to vary the combustion dynamics frequency from one combustor 12 to another. Thus, the combustion dynamics generated by the plurality of combustors 12 are less likely to result in coherent behavior that could potentially cause unwanted vibratory responses in the gas turbine system 10.

In the illustrated embodiment, the turbine system 10 has a plurality of combustors 12 (e.g., 12a and 12b) with one or more of the combustors 12 equipped with the orifice plate 13 disposed in the second fuel path 8. These orifice plates 13 may vary from one combustor 12 to another, such as in a number, arrangement, diameter, shapes, total effective orifice areas, or any combination thereof, of the orifice(s) present in the orifice plate 13. In this manner, the geometric arrangement of adjacent orifice plates 13 may be varied, thereby reducing modal coupling of the combustors, and therefore, any undesirable vibratory responses in downstream components. In some embodiments, the geometry of the orifice plates 13 may be altered in geometric shape, characteristic, and/or arrangement from one combustor 12 to another. In certain embodiments, the orifice plates 13 are not different in each combustor 12 and/or each combustor 12 does not have the orifice plate 13 disposed in the fuel circuit providing the second fuel 6 to the combustor 12. In the disclosed embodiments, the one or more orifice plates 13 of a subset, or group of combustors 12, is different from the one or more orifice plates 13 of another subset, or another group of combustors 12. A subset or group may include one or more combustors 12, and there may be any number of groups or subsets of combustors 12 (e.g., 2, 3, 4, 5, 6, or more) up to the number of combustors 12 included in the gas turbine system 10.

The gas turbine system 10 includes a compressor 14, one or more combustors 12 with the orifice plates 13 disposed in the second fuel path 8, and a turbine 16. One or more of the gas turbine combustors 12 may include the orifice plate 13 disposed in the second fuel path 8, which may be configured to direct the flow of the second fuel 6, or mixtures of the second fuel 6 with other materials, from a source of the second fuel 6 to one or more fuel nozzles 18 (e.g., 1, 2, 3, 4, 5, 6, or more) or the combustion chamber 19 within the combustor 12. For example, the orifice plate 13 is configured to route the second fuel 6 from the source of the second fuel 6 and into a respective combustion chamber 19 via the fuel nozzles 18 (e.g., using a quaternary fuel injector disposed upstream of the fuel nozzles 18, i.e. in an aft casing 15) or directly to the respective combustion chamber 19 without passing through the fuel nozzles 18 (e.g., using a late lean injector or LLI disposed circumferentially 46 around a liner, downstream of the fuel nozzles 18 in the head end), as is described further in FIG. 2. In addition, a first fuel 4 may be routed to the fuel nozzles 18 along a first fuel path 5. The gas turbine combustors 12 ignite and combust a pressurized oxidant (e.g., air) and fuel mixture (e.g., a mixture of air with the first fuel 4 and/or the second fuel 6) within the combustion chambers 19, and then pass resulting hot pressurized combustion gases 24 (e.g., exhaust) into the turbine 16. In particular, varying the geometry of the orifice plate 13 may vary the flow rate of the second fuel 6 routed from the source of the second fuel 6 to one or more of the quat pegs and/or the late lean fuel injectors of the combustion chamber 19. Further, varying the flow rate to one or more fuel circuits (via the first fuel flow path 5 and/or the second fuel flow path 8) to one or more combustors 12 may vary, adjust, or change the fuel split to one or more combustors 12, and therefore, the combustion dynamics within the combustion chamber 19 of one or more combustors 12. Varying the combustion dynamics, specifically the frequency, in one or more combustors 12 compared to the remaining combustors 12, may reduce the possibility of modal coupling between the combustors 12, and thus may reduce unwanted vibratory responses in the downstream components. As discussed in further detail below, the orifice plates 13 may be used to maintain a total fuel flow rate (e.g., sum of a flow rate of the first fuel 4 and a flow rate of the second fuel 6) approximately the same (e.g., within a range, such as within 10%, 5%, 3%, 2%, 1%, or less than one another) to each of the plurality of combustors 12. For example, if orifice plates 13 are disposed in the second fuel flow path 8 of a first group of combustors 12, then the flow rate of the first fuel 4 may be increased to the first group of combustors 12 to help maintain approximately the same (e.g., within a range of one another) total fuel flow rate to the combustors 12, while still changing the fuel split at the combustor-level, and therefore controlling the frequency (combustion dynamics) at the combustor-level, in order to induce a frequency difference, and therefore, reduced coherence or modal coupling of the combustion system. One way to increase the fuel flow rate of the first fuel 4 to the first group of combustors 12 is to dispose orifice plates 13 in the first fuel flow path 5 of a second group of combustors 12, but not dispose orifice plates 13 in the first fuel flow path 5 of the first group of combustors 12. In addition, the orifice plates 13 for the first group of combustors 12 may cause an increase in the flow rate of the second fuel 6 to a second group of combustors that do not have the orifice plates 13 disposed in the second fuel flow path 8. Thus, the flow rate of the first fuel 4 may be decreased to the second group of combustors 12 to help maintain approximately the same (e.g., within a range of one another) total fuel flow rate to the combustors 12. Other arrangements of the orifice plates 13 are possible and are described in detail below.

Turbine blades within the turbine 16 are coupled to a shaft 26 of the gas turbine system 10, which may also be coupled to several other components throughout the turbine system 10. As the combustion gases 24 flow against and between the turbine blades of the turbine 16, the turbine 16 is driven into rotation, which causes the shaft 26 to rotate. Eventually, the combustion gases 24 exit the turbine system 10 via an exhaust outlet 28. Further, in the illustrated embodiment, the shaft 26 is coupled to a load 30, which is powered via the rotation of the shaft 26. The load 30 may be any suitable device that generates power via the torque of the turbine system 10, such as an electrical generator, a propeller of an airplane, or other load.

The compressor 14 of the gas turbine system 10 includes compressor blades. The compressor blades within the compressor 14 are coupled to the shaft 26, and will rotate as the shaft 26 is driven to rotate by the turbine 16, as discussed above. As the compressor blades rotate within the compressor 14, the compressor 14 compresses air (or any suitable oxidant) received from an air intake 32 to produce pressurized air 34 (e.g., pressurized oxidant). The pressurized air (e.g., pressurized oxidant) 34 is then fed into the fuel nozzles 18 of the combustors 12. As mentioned above, the fuel nozzles 18 mix the pressurized air (e.g., pressurized oxidant) 34 and the first fuel 4 and/or second fuel 6 to produce a suitable mixture ratio for combustion. In the following discussion, reference may be made to an axial direction or axis 42 (e.g., a longitudinal axis) of the combustor 12, a radial direction or axis 44 of the combustor 12, and a circumferential direction or axis 46 of the combustor 12.

Figure 2:
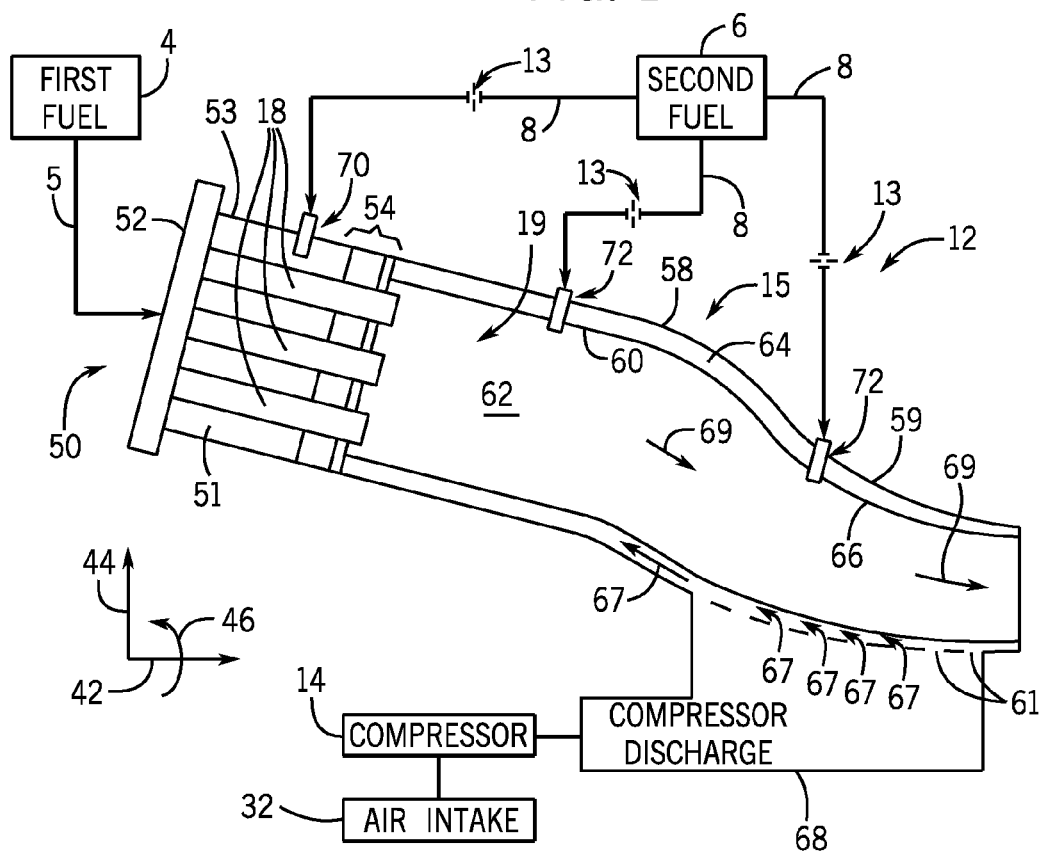
FIG. 2 is a cross-sectional schematic of an embodiment of one of the combustors of FIG. 1, wherein the combustor has an orifice plate configured to control combustion dynamics and/or modal coupling of combustion dynamics to reduce the possibility of unwanted vibratory responses in downstream components.

FIG. 2 is a cross-sectional view of an embodiment of one of the combustors 12 of FIG. 1, including the orifice plate 13 disposed in the second fuel path 8. The combustor 12 includes a head end 50, an end cover 52, a combustor cap assembly 54, and the combustion chamber 19. The head end 50 of the combustor 12 generally encloses the cap assembly 54 and fuel nozzles 18 in a head end chamber 51 positioned axially between the end cover 52 and the combustion chamber 19. The combustor cap assembly 54 generally contains the fuel nozzles 18. The fuel nozzles 18 route the first fuel 4 and/or the second fuel 6, oxidant, and sometimes other fluids to the combustion chamber 19. The combustor 12 has one or more walls extending circumferentially 46 around the combustion chamber 19 and the axis 42 of the combustor 12, and generally represents one of a plurality of combustors 12 that are disposed in a spaced arrangement circumferentially about a rotational axis (e.g., shaft 26) of the gas turbine system 10. In certain embodiments, the geometry of the orifice plates 13 may vary between two or more (or all) of the combustors 12 to vary the fuel split and therefore, the combustion dynamics among the combustors 12. For example, orifice plates 13 in different combustors 12, or in different groups of combustors 12, may include differences in geometric shape, geometric characteristics, and/or geometric arrangements of the plate and/or orifice(s) of the plate. Specifically, the variability in orifice plates 13, as discussed in detail below, helps to vary the fuel split, and therefore, the combustion dynamics in the plurality of combustors 12, such that the combustion dynamics frequency, and possibly amplitude of one or more combustors 12 is different from at least one other combustor 12 or group of combustors 12 within the gas turbine system 10. In this manner, the variability in orifice plates 13 helps to reduce unwanted vibratory responses in the gas turbine system 10, and therefore, minimizes vibrational stress, wear, and/or performance degradation of the gas turbine system 10.

In the illustrated embodiment, one or more fuel nozzles 18 are attached to the end cover 52, and pass through the combustor cap assembly 54 to the combustion chamber 19. For example, the combustor cap assembly 54 contains one or more fuel nozzles 18 (e.g., 1, 2, 3, 4, 5, 6, or more) and may provide support for each fuel nozzle 18. The combustor cap assembly 54 is disposed along a portion of the length of the fuel nozzles 18, housing the fuel nozzles 18 within the combustor 12. Each fuel nozzle 18 facilitates the mixing of pressurized oxidant and fuel (e.g., first fuel 4 and/or second fuel 6) and directs the mixture through the combustor cap assembly 54 into the combustion chamber 19. The oxidant-fuel mixture may then combust in a primary combustion zone 62 of the chamber 19, thereby creating hot pressurized exhaust gases. These pressurized exhaust gases drive the rotation of blades within the turbine 16.

Each combustor 12 includes an outer wall (e.g., flow sleeve 58) disposed circumferentially about an inner wall (e.g., combustor liner 60) to define an intermediate flow passage or space 64, while the combustor liner 60 extends circumferentially about the combustion chamber 19. The inner wall 60 also may include a transition piece 66, which generally converges toward a first stage of the turbine 16. An impingement sleeve 59 is disposed circumferentially 46 about the transition piece 66. The liner 60 defines an inner surface of the combustor 12, directly facing and exposed to the combustion chamber 19. The flow sleeve 58 and/or impingement sleeve 59 may include a plurality of perforations 61, which direct an oxidant flow 67 (e.g., an airflow) from a compressor discharge 68 into the flow passage 64 while also impinging air against the liner 60 and the transition piece 66 for purposes of impingement cooling. The flow passage 64 then directs the oxidant flow 67 in an upstream direction toward the head end 50 (e.g., relative to a downstream direction 69 of the hot combustion gases), such that the oxidant flow 67 further cools the liner 60 before flowing through the head end chamber 51, through the fuel nozzles 18, and into the combustion chamber 19.

The orifice plate 13 may have a particular geometry, such as a geometric shape, characteristic, or arrangement of orifice(s), which may be configured to vary the fuel split of the combustor 12, thereby varying the combustion dynamics (e.g., pressure pulsations, fluctuations, or oscillations) within the combustor 12. For example, the head end chamber 51 is defined or bounded by the end cover 52, the combustor cap assembly 54 axially 42 offset from the end cover 52, and a wall 53 extending circumferentially 46 around the chamber 51. A geometrical change to the orifice plate 13 disposed along the second fuel path 8 leading to a quaternary injector 70 (e.g., side wall injector, secondary injector, fuel-only injector, and so forth) disposed in the chamber 51 may change the flow of the second fuel 6 through the fuel nozzles 18 in the head end chamber 51, by pre-mixing the second fuel 6 with the oxidant prior to the fuel-oxidant mixture entering the fuel nozzles 18, thereby altering the equivalence ratio of the flame in the primary heat release (or flame) zone of the combustion chamber 19. Altering the fuel split in this manner alters the equivalence ratio of the flame, thereby altering the combustion dynamics of the combustor 12. For example, the orifice plate 13 may result in varying the frequency, and possibly the amplitude of the combustion dynamics of one combustor 12 with respect to another. In certain embodiments, the orifice plate 13 may be modified in a manner to tune the combustor 12 to operate at a certain frequency or within a certain frequency range. In multi-combustor 12 gas turbine systems 10, one or more combustors 12 may be equipped with an orifice plate 13 to restrict fuel flow of the second fuel 6 to the one or more combustors 12, that tunes the combustor or combustors 12 to operate at a certain frequency and/or frequency range. Additionally, one or more of the other combustors 12 may be equipped with the orifice plate 13, which may be different from or the same as the orifice plate 13 used for the second fuel 6, to restrict fuel flow of the first fuel 4 to the one or more other combustors 12, that tunes the other combustor or combustors 12 to operate at a different frequency and/or frequency range. In this way, one or more combustors 12 can be tuned to operate at a different frequency when compared to one or more of the remaining combustors 12, while maintaining a similar fuel flow to each combustor 12. Maintaining an approximately similar (e.g., within a range, such as within 10%, 5%, 3%, 2%, 1%, or less than one another) total fuel flow to each combustor 12 may be desirable in certain embodiments, but in other embodiments, not all the combustors 12 may have approximately the same total fuel flow. For example, the combustors 12 may be equipped with orifice plates 13 in the first fuel path 5 and/or second fuel flow path 8 that alternate combustion dynamics frequency from combustor-to-combustor, gradually step up or step down the combustion dynamics frequency or randomly distribute the combustion dynamics frequency among the plurality of combustors 12. In certain embodiments, the combustors 12 may be modified in groups of one or more combustors 12 such that a group of multiple combustors 12 may produce a single combustion frequency that is different from the combustion frequency of the combustors 12 in another group. Multiple groups of combustors 12, each producing its own combustion frequency, may be employed, with any desired spatial arrangement of the combustors 12 in a group (e.g., adjacent or alternating). In certain embodiments, there may be one or more combustors 12, or a group of combustors that does not have the orifice plate 13 in either the first flow path 5 or the second fuel flow path 8, which may result in those combustors 12 having a frequency different from one or more groups of combustors 12 that do include the orifice plate 13.

The end cover 52 may generally be configured to route a liquid fuel, a gas fuel, and/or a blended fuel from the fuel source and into the combustion chamber 19 via one or more of the fuel nozzles 18. The gas turbine combustor 12 ignites and combusts the pressurized oxidant and fuel mixture (e.g., an oxidant-fuel mixture) within the combustion chamber 19, and then passes resulting hot pressurized combustion gases 24 (e.g., exhaust) into the turbine 16 in the downstream direction 69. In certain embodiments, varying the geometry of the orifice plate 13 (e.g., disposed upstream of the quaternary injector 70) may vary, adjust, or change the fuel split in one or more combustors 12, and therefore, the combustion dynamics frequency of the one or more combustors 12, to achieve a combustion dynamics frequency difference among the combustors 12, and therefore, reduce unwanted vibratory responses in the gas turbine system 10.

As shown in FIG. 2, one or more orifice plates 13 may be disposed along the second fuel path 8 leading to one or more late lean injectors 72 disposed along the combustor 12 downstream of the head end 50. Specifically, the late lean injectors 72 may be used to inject the second fuel 6 into the combustion chamber 19 to adjust the characteristics of the combustion within the combustion chamber 19. For example, the late lean injectors 72 may be used to adjust a temperature range or profile within the combustion chamber 19 and/or adjust the composition of the combustion gases 24 produced in the combustion chamber 19. In addition, the late lean injectors 72 may be used to change the flame shape and/or the distribution of the heat release in the combustion chamber 19, which is expected to alter the combustion dynamics of the combustor 12. A geometrical change to the orifice plate 13 disposed along the second fuel path 8 leading to the late lean injector 72 may change the flow of the second fuel 6 through the combustion chamber 19, thereby altering the fuel split of the combustor 12. Thus, the orifice plates 13 leading to the late lean injectors 72 may be used in a similar manner to the orifice plate 13 leading to the quaternary injector 70 to reduce modal coupling between combustors 12. Further, it should be noted that although the combustor 12 illustrated in FIG. 2 includes both quaternary injectors 70 and late lean injectors 72, certain embodiments may not include both types of injectors.

Figure 3:
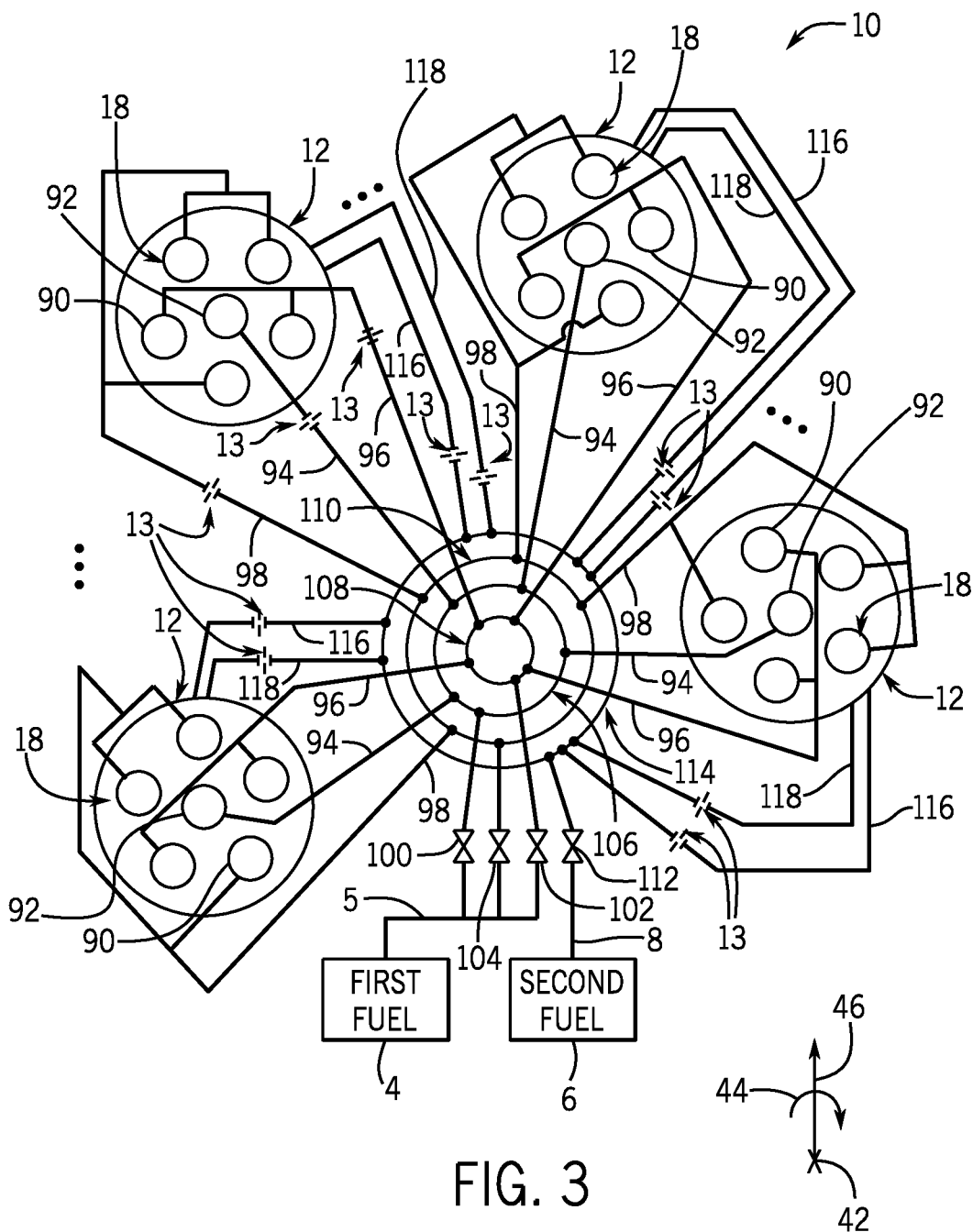
FIG. 3 is a schematic diagram of a gas turbine system having a plurality of combustors each equipped with an orifice plate configured to control combustion dynamics and/or modal coupling of combustion dynamics to reduce the possibility of unwanted vibratory responses in downstream components.

FIG. 3 is a schematic diagram of the gas turbine system 10 having a plurality of combustors 12, with one or more combustors 12 having the orifice plate 13 disposed in the second fuel path 8 and optionally in the first fuel path 5. In the illustrated embodiment, the gas turbine system 10 includes four combustors 12 coupled to the turbine 16. However, in other embodiments, the gas turbine system 10 includes any number of combustors 12 (e.g., 1, 2, 3, 4, 5, 6, 7, 8, 9, 10, 11, 12, 13, 14, 15, 16, or more combustors). Although orifice plates 13 are shown in FIG. 3 for each of the combustors 12, in certain embodiments, not all of the combustors 12 of the gas turbine system 10 have the orifice plate 13 disposed in the second fuel path 8. In certain embodiments, a subset of the combustors 12 may have the orifice plate 13 disposed in the second fuel path 8, while another subset of combustors 12 may have the orifice plate 13 disposed in the first fuel path 5, while a third subset of combustors 12 may not have the orifice plate 13 disposed in either the first or second fuel paths 5 and 8. As shown in FIG. 3, each of the combustors 12 includes a plurality of outer fuel nozzles 90 arranged radially 44 around a center fuel nozzle 92. In addition, each of the fuel nozzles 90, 92 may have a circular cross-sectional shape, although other shapes, such as a truncated pie-shape, may be used in certain embodiments. In certain embodiments, the number, shape, and arrangements of the fuel nozzles 90, 92 may be different from that shown in FIG. 3 and selected to achieve a desired combustion efficiency or performance.

As shown in FIG. 3, the fuel nozzles 90, 92 may be divided into various groups or circuits to facilitate multiple fueling regimes over the range of operation of the gas turbine system 10. For example, the center fuel nozzle 92 may define a primary fuel nozzle group and may receive the first fuel 4 from a first fuel supply line 94, while the surrounding outer fuel nozzles 90 may be grouped as secondary and/or tertiary fuel nozzle groups to receive the first fuel 4 (or a different fuel) from respective fuel supply lines 96, 98. The illustrated embodiment shows one particular arrangement of fuel nozzles 90, 92 in which a secondary fuel nozzle group of two non-adjacent fuel nozzles 90 is supplied by the second fuel supply line 96 and a tertiary fuel nozzle group of three fuel nozzles 90 is supplied by the third fuel supply line 98. However, in certain embodiments, other groupings of fuel nozzles 90, 92 may instead be used, including groupings that include the center fuel nozzle 92 and one or more of the outer fuel nozzles 90. In addition, as shown in FIG. 3, one or more orifice plates 13 may be disposed in the fuel supply lines 94, 96, and/or 98 to adjust the flow rate of the first fuel 4 to one or more of the combustors 12. As discussed below, these orifice plates 13 may be used to help maintain approximately the same total (e.g., sum of the flow rate of the first fuel 4 and the flow rate of the second fuel 6) fuel flow rate to each of the combustors 12. The orifice plates 13 in the first fuel path 5 may also alter the equivalence ratio of the primary flame zone and/or the pressure ratio of one or more fuel nozzles 18 in the head end 50, which may also alter the combustion dynamics amplitude and/or frequency of one or more combustors 12.

During base load operations, all of the fuel lines 94, 96, and 98 may be used to supply the first fuel 4 to the fuel nozzles 90, 92 in the combustors 12 (with respective fuel lines 94, 96, and 98 supplying respective primary, secondary, and tertiary groupings of the fuel nozzles 90, 92). The flow of the first fuel 4 may be reduced or completely eliminated from one or more groups of the fuel nozzles 90, 92 during reduced or turndown operations, as dictated by primary, secondary, and tertiary gas control valves 100, 102, and 104 coupled to corresponding primary, secondary, and tertiary fuel manifolds 106, 108, and 110. In addition, the flow of the second fuel 6 to the quaternary injectors 70 and/or the late lean injectors 72 may be used at higher loads of the gas turbine system 10.

As shown in FIG. 3, the second fuel 6 is provided to one or more of the combustors 12 along the second fuel path 8, which may be adjusted by a second fuel control valve 112 coupled to second fuel manifold 114. Orifice plates 13 may be disposed along individual second fuel supply lines for one or more of the combustors 12. For example, one or more combustors 12 may be coupled to the second fuel manifold 114 via a quaternary fuel supply line 116 or a late lean fuel supply line 118. Although both the quaternary fuel supply lines 116 and the late lean fuel supply lines 118 are shown coupled to the second fuel manifold 114 in FIG. 3, in certain embodiments, separate second fuel manifolds 114 may be provided for the supply lines 116 and 118. In other words, a quaternary fuel manifold may supply the second fuel 6 to the quaternary fuel supply lines 116 and a late lean fuel manifold may supply the second fuel 6 to the late lean fuel supply lines 118. In such embodiments, the separate quaternary and late lean fuel manifolds may enable different fuels to be supplied to the quaternary and late lean injectors 70 and 72 and/or enable the fuel to the injectors 70 and 72 to be controlled differently from one another. In certain embodiments, the combustors 12 may include quaternary injectors 70 or late lean injectors 72, but not both. Thus, in such embodiments, the gas turbine system 10 may not include separate quaternary and late lean fuel manifolds. As shown in FIG. 3, one or more of the quaternary fuel supply lines 116 may include the orifice plate 13 and/or one or more of the late lean fuel supply lines 118 may also include the orifice plate 13. In certain embodiments, at least one of the quaternary fuel supply lines 116 includes the orifice plate 13 and/or at least one of the late lean fuel supply lines 118 includes the orifice plate 13. In addition, in certain embodiments, one or more of the combustors 12 may not include the orifice plate 13 in either the quaternary or late lean fuel supply lines 116 and 118, but may include one or more orifice plates 13 in one or more of the first fuel supply lines 94, 96, and/or 98. In other words, reduction of modal coupling between the combustors 12 may be achieved without all of the supply lines 116 and 118 having the orifice plate 13. Further, as discussed above, the orifice plates 13 may include one or more differences from one another. However, in certain embodiments, the orifice plates 13 used in the gas turbine system 10 may not be different from one another. For example, orifice plates 13 may be disposed in the first fuel path 5 for a first group of combustors 12, orifice plates 13 may be disposed in the second fuel path 8 for a second group of combustors 12, and a third group of combustors 14 may not include any orifice plates 13. In such embodiments, although the orifice plates 13 may be similar to one another, the placement of the orifice plates 13 in the gas turbine system 10 may help reduce combustion dynamics and/or modal coupling of combustion dynamics in the gas turbine system 10.

The effective orifice area for each orifice plate 13 may be substantially different for the fuel supply lines 116, 118 and the first fuel lines 94, 96, and 98 when orifice plates 13 are used for the first fuel 4 based on the desired difference, or bias, in the fuel splits from one combustor 12 (e.g., a first combustor) to another combustor 12 (e.g., a second combustor). Changing the fuel split between the combustors 12 using the orifice plates 13 directly affects the frequency and/or amplitude of the combustion dynamics, and changing the frequency in one or more combustors 12 compared to the other combustors 12 may reduce coherence and, therefore, modal coupling of combustion dynamics.

In the illustrated embodiment shown in FIG. 3, for example, the effective orifice area of at least one of the orifice plates 13 disposed in the quaternary fuel supply line 116 (or late lean fuel supply line 118) is substantially different from the effective orifice area of another orifice plate 13 disposed in another fuel supply line 116 (or fuel supply line 118). In one embodiment, at least one of the effective orifice areas of the orifice plates 13 is substantially different between two or more combustors 12 to produce a difference in combustion dynamics frequencies between two or more combustors 12. Alternately, in certain embodiments, orifice plates 13 may be disposed in the first fuel path 5 for a subset of combustors 12, while there may be orifice plates 13 disposed in the second fuel flow path 8 for a second subset of combustors 12. In such embodiments, the orifice plates 13 disposed in the first fuel flow path 5 in each of the subset of combustors 12 may be the same, and may be the same or different from the orifice plates 13 disposed in the second fuel flow path 8 in the second subset of combustors 12. Further, there may be a third set of combustors 12 with no orifice plates 13 disposed in either the first fuel flow path 5 or the second fuel flow path 8. Further, while reference is made to individual combustors 12 in the describing various embodiments, the principles described herein may equally be applied to combustor groups having two or more combustors 12.

Figure 4:
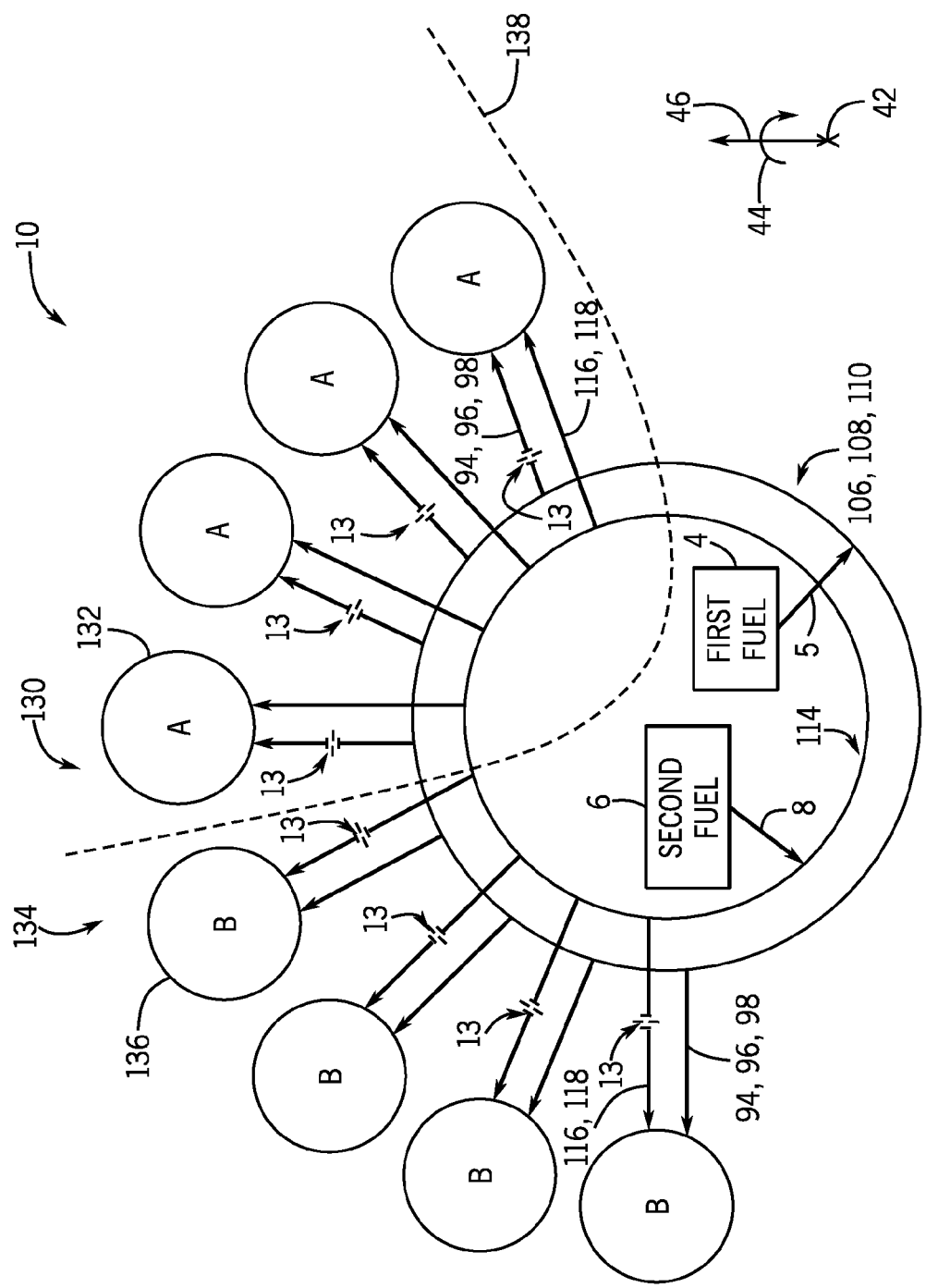
FIG. 4 is a schematic diagram of a gas turbine system having a first plurality of first combustors and a second plurality of second combustors arranged in a pattern to control combustion dynamics and/or modal coupling of combustion dynamics to reduce the possibility of unwanted vibratory responses in downstream components.

FIG. 4 is a schematic diagram of a gas turbine system 10 having a first group 130 of first combustors 132 (e.g., "A" combustors) and a second group 134 of second combustors 136 (e.g., "B" combustors) arranged in a pattern and separated from one another by an imaginary dividing line 138. Other groups of combustors 12 may also be disposed circumferentially 46 about the gas turbine system 10. One or more orifice plates 13 may be disposed in the fuel supply lines 116, 118 (e.g., second fuel path 8) and optionally in one or more of the first fuel lines 94, 96, and 98 (e.g., first fuel path 5) to adjust the flow of the second fuel 6 and optionally the first fuel 4 to one or more of the combustors 12, so that the combustion dynamics frequency of the first group 130 is different from the combustion dynamics frequency of the second group 134. Thus, the orifice plates 13 may be adjusted or tuned to achieve a desired combustion dynamics frequency. The orifice plates 13 of the first group 130 may be different from the orifice plates 13 of the second group 134. For example, the orifice plates of the first and second groups 130 and 134 may differ in the number of orifices, sizes of orifices, shapes of orifices, spacings between orifices, radial and/or circumferential distribution of orifices, angles of orifices, effective orifice areas, and so forth. In addition, the combustors 12 in the first and second groups 130 and 134 may be arranged in any desired spatial orientation (e.g., adjacent to one another or in an alternating pattern with combustors 12 of another group). Although orifice plates 13 are shown in both the first and second groups 130 and 134 in FIG. 6, in certain embodiments, the orifice plates 13 may be used with only the first group 130 or only the second group 134.

As shown in FIG. 4, the orifice plates 13 may be disposed in the fuel supply lines 116, 118 for the second group 134. The restriction to the flow rate of the second fuel 6 through the fuel supply lines 116, 118 of the second group 134 may cause an increased flow rate of the second fuel 6 through the fuel supply lines 116, 118 of the first group 130. If the flow rates of the first fuel 4 through the combustors 12 is not adjusted, the total fuel flow rate (e.g., sum of the flow rate of the first fuel 4 and the flow rate of the second fuel 6) through the combustors 12 of the first group 130 may be greater than the total fuel flow rate through the combustors 12 of the second group 134 because of the increased flow rate of the second fuel 6. In certain embodiments, such differences in the total fuel flow rate through the combustors 12 may cause differences in combustor performance, such as differences in combustor temperatures and/or combustor emissions (e.g., $NO_x$). Thus, the orifice plates 13 may also be disposed in the first fuel lines 94, 96, and 98 of the first group 130. Specifically, the orifice plates in the first fuel lines 94, 96, and 98 of the first group 130 may cause a restriction to the flow rate of the first fuel 4 through the lines 94, 96, and 98, which may cause an increased flow rate of the first fuel 4 through the lines 94, 96, and 98 of the second group 134. The decrease in the flow rate of the first fuel 4 through the lines 94, 96, and 98 of the first group 130 may be approximately the same as the increase in the flow rate of the second fuel 6 through the lines 116, 118 of the first group 130. Similarly, the decrease in the flow rate of the second fuel 6 through the lines 116, 118 of the second group 134 may be approximately the same as the increase in the flow rate of the first fuel 4 through the lines 94, 96, and 98 of the second group 134. Thus, by using orifice plates 13 in both the first and second groups 130 and 134, the total fuel flow rates to the combustors 12 may all be approximately the same (e.g., within a range, such as within 10%, 5%, 3%, 2%, 1%, or less than one another), thereby reducing differences in combustor performance. In certain embodiments, the orifice plates 13 in the first group 130 may be omitted. In further embodiments, orifice plates 13 may be disposed in the lines 94, 96, and 98 of both the first and second groups 130 and 134 and the orifices plates 13 disposed in the first group 130 may or may not be different from the orifice plates 13 disposed in the second group 134. Additionally or alternatively, in certain embodiments, orifice plates 13 may be disposed in the lines 116, 118 of both the first and second groups 130 and 134 and the orifices plates 13 disposed in the first group 130 may or may not be different from the orifice plates 13 disposed in the second group 134. Further, in any of the disclosed embodiments, some of the combustors 12 may not include orifice plates in any of the lines 94, 96, 98, 116, or 118.

Technical effects of the invention include reducing combustion dynamics in combustors 12, reducing combustion dynamics and/or modal coupling of combustion dynamics between multiple combustors 12, and reducing potential unwanted vibratory responses in the gas turbine system 10 (e.g., due to frequencies matching natural frequencies of components). The orifice plates 13 disposed in the second fuel path 8 are able to achieve these technical effects by, for example, varying the flow rate of the first fuel 4 and/or second fuel 6 to one or more combustors 12, thereby altering the fuel split to one or more combustors 12. For example, the orifice plates 13 of multiple combustors 12 can be varied by changing the following characteristics of the orifice plate 13 and/or the orifices of the plate 13: the geometric shape (e.g., angled, concaved, convexed, concavely angled, convexly angled, shaped similar to various polygons, irregularly shaped, irregularly angled, etc.), the geometric characteristics (e.g., dimensions, height, width, depth, length, degree of angle, angle characteristics, etc.), geometric arrangements (e.g., position, location, etc.), and/or any combination thereof. Varying the orifice plates 13 of one or more combustors 12 may change the inlet conditions of the second fuel 6 routed to the combustion chamber 19, and may vary the combustion dynamics within the one or more combustors 12. In addition, in certain embodiments, additional orifice plates 13 may be used to adjust the flow rates of the first fuel 4 through the combustors 12. Accordingly, the variability in combustion dynamics among the plurality of combustors 12 may help to reduce combustion dynamics and/or modal coupling of combustion dynamics between the combustors 12, thereby helping to reduce the possibility of any dominant frequencies that could potentially trigger unwanted vibratory responses in the gas turbine system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gas turbine engine comprising:
a first combustor comprising:
  a first head end chamber;
  a first combustion chamber disposed downstream from the first head end chamber;
  a first inner wall disposed about the first combustion chamber;
  a first outer wall disposed about the first inner wall;
  a first flow path extending between the first inner wall and the first outer wall in a first upstream direction to the first head end chamber;
  a first fuel nozzle disposed in the first head end chamber of the first combustor, wherein the first fuel nozzle is configured to inject a first fuel and an oxidant into the first combustion chamber of the first combustor; and
  a first fuel injector coupled to at least one of the first inner wall or the first outer wall, wherein the first fuel injector is configured to inject a second fuel into at least one of the oxidant upstream of the first fuel nozzle, or the first combustion chamber downstream of the first fuel nozzle, or any combination thereof;
  a first orifice plate disposed in a first fuel path upstream of the first fuel injector, wherein the first orifice plate comprises at least two first orifices configured to route the second fuel to the first fuel injector, and a first fuel split between the first and second fuels in the first combustor is at least partially defined by the first orifice plate; and
a second combustor comprising:
  a second head end chamber;
  a second combustion chamber disposed downstream from the second head end chamber;
  a second inner wall disposed about the second combustion chamber;
  a second outer wall disposed about the second inner wall;
  a second flow path extending between the second inner wall and the second outer wall in a second upstream direction to the second head end chamber;
  a second fuel nozzle disposed in the second head end chamber of the second combustor, wherein the second fuel nozzle is configured to inject the first fuel and the oxidant into the second combustion chamber of the second combustor;
  a second fuel injector coupled to at least one of the second inner wall or the second outer wall, wherein the second fuel injector is configured to inject the second fuel into at least one of the oxidant upstream of the second fuel nozzle, or the second combustion chamber downstream of the second fuel nozzle, or any combination thereof; and
  a second orifice plate disposed in a second fuel path upstream of the second fuel injector, wherein the second orifice plate comprises at least two second orifices configured to route the second fuel to the second fuel injector, a second fuel split between the first and second fuels in the second combustor is at least partially defined by the second orifice plate, and the first and second fuel splits differ from one another to reduce modal coupling between the first combustor and the second combustor.

2. The system of claim 1, wherein a first effective orifice area of the first orifice plate is different from a second effective orifice area of the second orifice plate.

3. The system of claim 1, wherein the first orifice plate comprises at least one difference relative to the second orifice plate, and wherein the at least one difference comprises a different spacing between the at least two first orifices relative to the at least two second orifices.

4. The system of claim 1, wherein the first orifice plate comprises at least one difference relative to the second orifice plate, and wherein the at least one difference comprises a different number of the at least two first orifices relative to the at least two second orifices.

5. The system of claim 1, wherein the first orifice plate comprises at least one difference relative to the second orifice plate, and wherein the first orifice plate is configured to at least partially control first combustion dynamics in the first combustor, wherein the second orifice plate is configured to at least partially control second combustion dynamics in the second combustor, and the at least one difference between the first and second orifice plates causes differences between the first and second combustion dynamics.

6. The system of claim 1, wherein the first orifice plate comprises at least one difference relative to the second orifice plate, and wherein the at least one difference comprises at least one of different orifice diameters, different orifice shapes, different numbers of orifices, different geometrical arrangements of orifices, or different distances between adjacent orifices, or any combination thereof, between the first and second orifice plates.

7. The system of claim 1, wherein the first fuel injector and the second fuel injector comprise at least one of late lean injectors, or quaternary fuel injectors, or any combination thereof.

8. The system of claim 1, wherein the second combustor comprises:
  a third fuel injector configured to inject the second fuel into at least one of the oxidant upstream of the second fuel nozzle, or the second combustion chamber downstream of the second fuel nozzle, or any combination thereof; and
  a third orifice plate disposed in the second fuel path upstream of the third fuel injector, wherein the third orifice plate is configured to help reduce modal coupling between the first combustor and the second combustor.

9. The system of claim 1, comprising:
a first plurality of first combustors; and
a second plurality of second combustors, wherein the first and second combustors are arranged in a pattern to help reduce modal coupling between the first plurality of first combustors and the second plurality of second combustors.

10. The system of claim 1, comprising a third orifice plate, wherein the third orifice plate is disposed in a third fuel path upstream of the first fuel nozzle, or the third orifice plate is disposed in a fourth fuel path upstream of the second fuel nozzle, or any combination thereof, wherein the third orifice plate is configured to help reduce modal coupling between the first combustor and the second combustor.

11. A method, comprising:
injecting a first fuel and an oxidant into a first combustion chamber of a first combustor using a first fuel nozzle disposed in a first head end chamber of the first combustor;
injecting a second fuel into at least one of the oxidant upstream of the first fuel nozzle, or the first combustion chamber downstream of the first fuel nozzle, or any combination thereof, using a first fuel injector;
controlling first combustion dynamics in the first combustor with a first orifice plate disposed in a first fuel path upstream of the first fuel injector, wherein the first orifice plate comprises at least two first orifices configured to route the second fuel to the first fuel injector, and a first fuel split between the first and second fuels in the first combustor is at least partially defined by the first orifice plate;
injecting the first fuel and the oxidant into a second combustion chamber of a second combustor using a second fuel nozzle disposed in a second head end chamber of the second combustor;
injecting the second fuel into at least one of the oxidant upstream of the second fuel nozzle, or the second combustion chamber downstream of the second fuel nozzle, or any combination thereof, using a second fuel injector; and
controlling second combustion dynamics in the second combustor with a second orifice plate disposed in a second fuel path upstream of the second fuel injector, wherein the second orifice plate at least partially defines a second fuel split between the first and second fuels in the second combustor, and the first and second fuel splits differ from one another to reduce modal coupling between the first combustor and the second combustor.

12. The method of claim 11, comprising controlling first combustion dynamics in the first combustor with a third orifice plate disposed in a third fuel path upstream of the first fuel nozzle, wherein the third orifice plate is configured to help reduce modal coupling between the first combustor and the second combustor.

13. The method of claim 12, comprising maintaining a first total fuel flow to the first combustor within a range of a second total fuel flow to the second combustor using the second orifice plate and the third orifice plate, wherein the first total fuel flow comprises the first fuel and the second fuel to the first combustor, and the second total fuel flow comprises the first fuel and the second fuel to the second combustor.

14. The method of claim 11, comprising reducing modal coupling between the first and second combustors via at least one difference between the first and second orifice plates.

15. A system, comprising:
a first combustor of a gas turbine engine, wherein the first combustor comprises:
a first head end chamber;
a first combustion chamber disposed downstream from the first head end chamber;
a first inner wall disposed about the first combustion chamber;
a first outer wall disposed about the first inner wall;
a first flow path extending between the first inner wall and the first outer wall in a first upstream direction to the first head end chamber;
a first fuel nozzle disposed in the first head end chamber of the first combustor, wherein the first fuel nozzle is configured to inject a first fuel and an oxidant into the first combustion chamber of the first combustor; and
a first fuel injector coupled to at least one of the first inner wall or the first outer wall, wherein the first fuel injector is configured to inject a second fuel;
wherein the first combustor has a first fuel split between the first fuel to the first fuel nozzle and the second fuel to the first fuel injector; and
a second combustor of the gas turbine engine, wherein the second combustor comprises:
a second head end chamber;
a second combustion chamber disposed downstream from the second head end chamber;
a second inner wall disposed about the second combustion chamber;
a second outer wall disposed about the second inner wall;
a second flow path extending between the second inner wall and the second outer wall in a second upstream direction to the second head end chamber;
a second fuel nozzle disposed in the second head end chamber of the second combustor, wherein the second fuel nozzle is configured to inject the first fuel and the oxidant into the second combustion chamber of the second combustor;
a second fuel injector coupled to at least one of the second inner wall or the second outer wall, wherein the second fuel injector is configured to inject the second fuel; and
wherein the second combustor has a second fuel split between the first fuel to the second fuel nozzle and the second fuel to the second fuel injector, and the first and second fuel splits differ from one another to reduce modal coupling between the first combustor and the second combustor.

16. The system of claim 15, wherein the first fuel injector is disposed axially upstream of a combustor cap assembly, wherein the first fuel injector is radially positioned in the first flow path, and wherein the first fuel injector is configured to inject a second fuel flow into the first flow path.

17. The system of claim 15, further comprising a first effective orifice area of a first orifice plate is different from a second effective orifice area of a second orifice plate.

18. The system of claim 17, wherein the first orifice plate is configured to at least partially control first combustion dynamics in the first combustor, wherein the second orifice plate is configured to at least partially control second combustion dynamics in the second combustor, and at least one difference between the first and second orifice plates causes differences between the first and second combustion dynamics.

* * * * *